United States Patent
Figge, Sr.

[11] Patent Number: 6,142,417
[45] Date of Patent: Nov. 7, 2000

[54] SELF-DEPLOYING AIR INLET FOR AN AIR BREATHING MISSILE

[75] Inventor: Irving E. Figge, Sr., Manassas, Va.

[73] Assignee: Atlantic Research Corporation, Gainesville, Va.

[21] Appl. No.: 09/178,764

[22] Filed: Oct. 26, 1998

[51] Int. Cl.[7] .................................................. B64D 33/02
[52] U.S. Cl. ...................................... 244/53 B; 137/15.1
[58] Field of Search ...................... 244/53 B; 60/270.1; 137/15.1, 15.2

[56] References Cited

U.S. PATENT DOCUMENTS

| | | | |
|---|---|---|---|
| 3,059,878 | 10/1962 | Kerry et al. | 244/53 B X |
| 3,474,807 | 10/1969 | Holmes et al. | 137/15.1 |
| 3,652,036 | 3/1972 | Sans et al. | 244/53 B |
| 3,659,424 | 5/1972 | Polk, Jr. | 60/269 |
| 4,121,606 | 10/1978 | Holland et al. | 137/15.1 |
| 4,221,230 | 9/1980 | Nicoloff et al. | 137/15.1 |
| 4,307,743 | 12/1981 | Dunn | 137/15.1 |
| 4,378,097 | 3/1983 | Ferguson et al. | 244/53 B |
| 4,418,708 | 12/1983 | Schulze et al. | 137/15.2 |
| 4,418,879 | 12/1983 | Vanderleest | 244/53 B |
| 4,456,204 | 6/1984 | Hapke | 244/53 B |
| 4,463,772 | 8/1984 | Ball | 137/15.2 |
| 4,474,344 | 10/1984 | Bennett | 244/53 B |
| 4,620,679 | 11/1986 | Karanian | 244/53 B |
| 4,655,413 | 4/1987 | Genssler et al. | 244/53 B |
| 4,763,858 | 8/1988 | Belisle et al. | 244/53 B |
| 5,301,901 | 4/1994 | Kutschenreuter, Jr. | 244/53 R |
| 5,697,394 | 12/1997 | Smith et al. | 244/53 B X |

*Primary Examiner*—Robert P. Swiatek
*Attorney, Agent, or Firm*—Nixon & Vanderhye PC; Frank P. Prestia

[57] ABSTRACT

A self-deploying inlet for an air breathing missile including an inlet body having a natural shape which defines a deployed condition for the air inlet, wherein an air deflecting surface is provided thereby. The inlet body is made from a material having a flexibility which enables the inlet body to flex from the deployed condition to a stowed condition, and a resiliency which biases the inlet body toward the deployed condition when in the stowed condition. The air inlet further includes a sealing connector system for connecting the inlet body to the vehicle in a manner which enables the inlet body to move between the stowed condition and the deployed condition. The natural spring force provided by the resiliency of the inlet body, along with the aerodynamic forces to which the inlet is subjected during missile flight, are sufficient to cause the inlet to self-deploy to the deployed condition from the stowed condition without the need for a deployment actuator.

14 Claims, 4 Drawing Sheets

SELF-DEPLOYING AIR INLET FOR AN AIR BREATHING MISSILE

FIELD OF THE INVENTION

The present invention relates to an air inlet duct for air breathing missile systems, and, more particularly, to an air inlet duct made of flexible and resilient material that self-deploys by its own resiliency to a deployed condition adjacent to the outer body of a missile in response to a simple release mechanism.

BACKGROUND OF THE INVENTION

It is well known that where a jet-propelled missile is powered by an air-breathing jet engine, an air inlet duct must be provided to supply the engine with a requisite amount of compressed-air energy. These missiles are generally launched from a container or canister which protects the missile during shipping and handling and also acts as a guide during the initial flight phase of the missile. The cylindrical cross section of the canister requires that any wings, fins or ducts not project beyond the missile contour until the missile is in flight.

A variety of movable, folding or collapsible air inlet ducts have been used in the past, as evidenced by, for example, U.S. Pat. No. 4,221,230 to Nicoloff et al. (1990); U.S. Pat. No. 3,659,424 to Polk, Jr. (1972); U.S. Pat. No. 4,121,606 to Holland et al. (1978); U.S. Pat. No. 4,418,879 to Vanderleest (1983); U.S. Pat. No. 4,307,743 to Dunn (1981); U.S. Pat. No. 5,301,901 to Kutschenreuter, Jr. (1994); U.S. Pat. No. 4,620,679 to Karanian (1986); and U.S. Pat. No. 4,655,413 to Genssler et al. (1987). While effective in many applications, the prior art deployable air inlet ducts tend to be mechanically complex and heavy, they frequently occupy an undesirable large portion of the internal vehicle volume, and since these ducts often are not flush with the missile's outer body when in the stowed position, they typically cause considerable drag at high speeds. Prior art air inlet ducts also utilize various hinges and linkages to enable movement of the air inlet duct from the stowed to the deployed positions. In addition, the prior art has taught the movement of the air inlet duct by a mechanical or hydraulic actuator responsive to a computer-initiated signal that deploys the duct along its hinges or linkages to an optimum extended position.

It would be desirable to provide a lightweight, simple, aerodynamically clean and inexpensive self-deploying air inlet duct in which movement between the deployed and stowed positions would be obtained at a predetermined time without the necessity for complicated hinges, links and actuators.

SUMMARY OF THE INVENTION

Therefore, it is a general object of the present invention to provide a self-deployable air inlet duct overcoming the above-noted problems and disadvantages.

Another object of this invention is to provide a self-deployable air inlet duct of improved simplicity and reliability.

A further object of this invention is to provide a lightweight, self-deployable air inlet duct which occupies only a small portion of the internal missile volume when housed.

Yet another object of this invention is to provide a self-deployable air inlet duct that provides an aerodynamically clean outer missile surface prior to being deployed.

A yet further object of this invention is to provide a lightweight, self-deployable air inlet duct that only requires a minimum number of parts to enable movement of the air inlet duct from the stowed to the deployed positions.

Still a further object of this invention is to provide a lightweight, self-deployable air inlet duct capable of being deployed through the use of a simple release mechanism.

Still another object of the instant invention is to provide an improved air inlet that is capable of being self-deployed by a natural spring force generated by the resiliency of the material from which the air inlet is constructed.

These and other objects and advantages are achieved by the present invention, which provides a self-deploying air inlet for an air-breathing vehicle, such as a missile or the like. In accordance with the instant invention, the air inlet includes an inlet body having a natural shape which defines a deployed condition for the air inlet, wherein an air deflecting surface is provided thereby. The inlet body is made from a material having a flexibility which enables the inlet body to flex from the deployed condition to a stowed condition, and a resiliency which biases the inlet body toward the deployed condition when the inlet body is in the stowed condition. The air inlet further includes connecting means for connecting the inlet body to the vehicle in a manner which enables the inlet body to move between the stowed condition and the deployed condition, while also securely maintaining the inlet in the proper position on the vehicle. The natural spring force provided by the resiliency of the inlet body, along with the aerodynamic forces to which the inlet is subjected during missile flight, are sufficient to cause the inlet to self-deploy to the deployed condition from the stowed condition without the need for a deployment actuator.

In accordance with another aspect of the instant invention, the inlet body has a generally curved shape and includes a forward body portion having a greater radius of curvature when in the stowed condition than when in the deployed condition. More particularly, the forward body portion has a radius of curvature when in the deployed condition which is less than the radius of curvature of the outer surface of the vehicle at a location on the vehicle where the inlet is connected therewith. When in the stowed condition, the radius of curvature of the inlet body preferably corresponds to the radius of curvature of the outer surface of the vehicle.

In accordance with a more particular aspect of the instant invention, the connecting means includes a sliding connector secured to each side edge of the inlet body, wherein the sliding connector is constructed and arranged to be slidably received and retained in corresponding connecting slots in the vehicle. In the preferred embodiment, the air inlet includes a cover secured to the vehicle, and the connecting slots are defined by spacing between the cover and the vehicle. The sliding connector and the cover preferably include cooperating interlocking elements which engage when the inlet body is in the deployed condition to provide an air seal therebetween.

In accordance with a further aspect of the instant invention, the air inlet further includes latching means on the inlet body operable to selectively hold the inlet body in the stowed condition against the biasing from the resiliency of the inlet body until the deployed condition is desired.

BRIEF DESCRIPTION OF THE DRAWINGS

Other objects, features and advantages of the subject invention will become apparent from a study of the following specification when viewed in light of the accompanying drawings, in which.

DETAILED DESCRIPTION OF THE PREFERRED EMBODIMENTS

In the following detailed description of the preferred embodiment, reference is made to the accompanying drawings, and in which is shown by way of illustration a specific embodiment in which the invention may be practiced. This embodiment is described in sufficient detail to enable those skilled in the art to practice the invention, and it is to be understood that other embodiments may be utilized and that structural changes may be made without departing from the true scope of the present invention. The following detailed description is, therefore, not to be taken in a limited sense.

Figure 1:
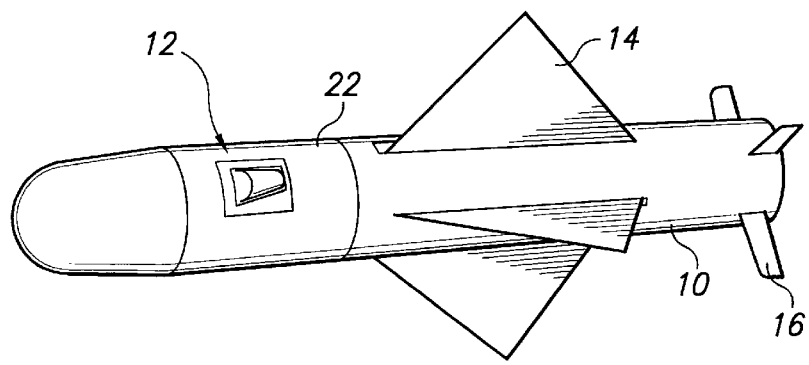
FIG. 1 is a perspective view of a typical missile having installed thereon a self-deploying air inlet in accordance with a preferred embodiment of the instant invention.

Referring first to FIG. 1, there is shown a perspective view of an exemplary missile 10 in flight and having an air inlet 12 thereon constructed in accordance with a preferred embodiment of the instant invention. While only one inlet 12 is shown, any suitable number of inlets can be used depending on the particular application in which the instant invention is employed. The missile 10 can have any required configuration of warhead, guidance and/or propulsion means to suit any specific operation. Since such missiles 10 may be launched from submarines and/or may be stored in or launched from shipping containers or canisters, it is necessary that the air inlet 12, wings 14 and fins 16 be retracted prior to launch. Immediately upon launch, wings 14 and fins 16 must quickly and positively deploy. At some period of time after launch, duct 12 must also deploy to facilitate the liquid propulsion phase of the missile's flight. Inasmuch as air breathing missiles are well known in the art, no further details regarding the missile itself are provided herein.

Figure 2:
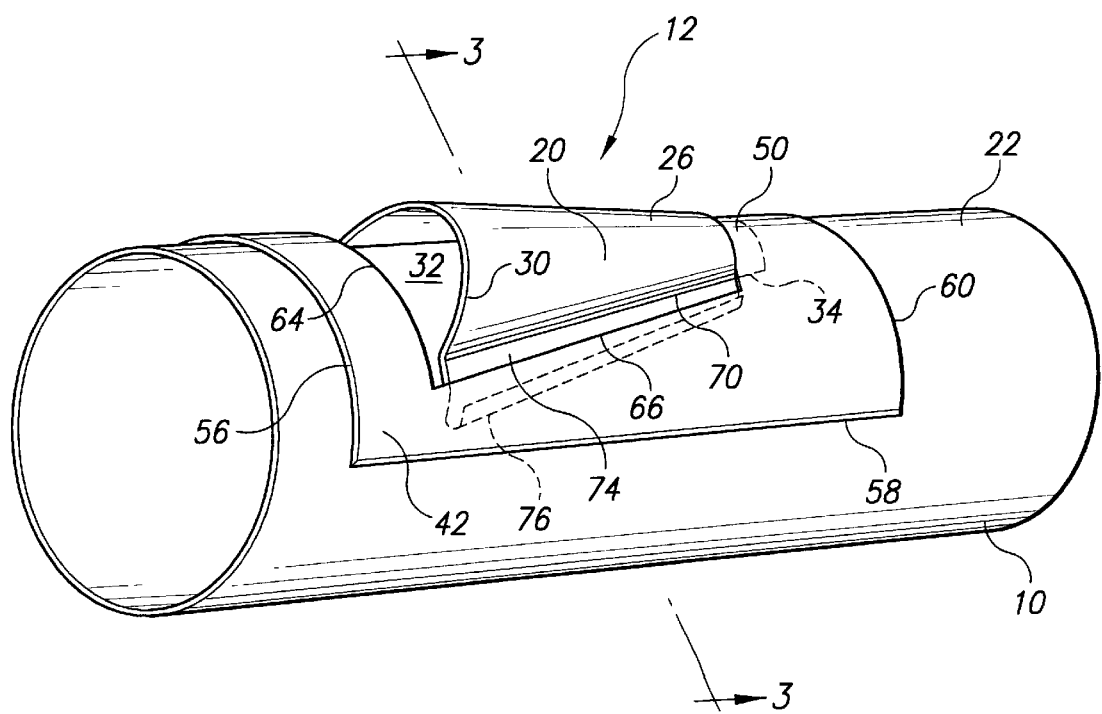
FIG. 2 is an enlarged view of the self-deploying air inlet shown in FIG. 1 in its deployed condition.

Referring now to FIG. 2, the air inlet 12 includes an inlet body 20 preferably comprised of a piece of sheet-like material with a generally curved configuration defining an outer surface 26 and an inner surface 28 for the inlet body 20. In accordance with an important aspect of the instant invention, the inlet body 21 is molded or otherwise fabricated such that it has a natural shape which defines a deployed condition for the inlet 12 as shown in FIG. 2. The term "natural shape" as used herein means a generally unstressed state for the inlet body 12 or, in other words, the shape of the inlet body 12 when no external or deforming forces are being applied thereto. The natural shape of the inlet body 12, which defines the deployed condition for the inlet 20, is such that, when the inlet 12 is positioned on a cylindrical missile body 10, a forward edge 30 of the inlet body 20 extends outwardly therefrom, thereby defining an inlet opening 32 and causing the inner surface 28 of the inlet body to act as an air deflecting surface. In its natural shape, the forward edge of the inlet body has a radius of curvature which is less than the radius of curvature of the missile body 22, thereby defining the air deflecting surface 28 when inlet is installed on a missile.

The air deflecting surface 28 ducts or funnels air to an internal passage (not shown) in the missile body 22 adjacent a rear edge 34 of the inlet body 20 and to a jet engine (not shown) housed within the cylindrical body 22 of the missile 10, thereby providing air to the air breathing missile 10 during flight. The inlet body 20 may have any suitable shape in plan form, such as a square shape, a rectangular shape, or the tapered shape shown in the drawings. The inlet body 20 may be made of any suitable material, such as a metal or composite material, having suitable flexibility and resiliency to operate in the manner described herein. The inlet body 20 is attached to the missile body 22 at the rear edge 34 by a hinging device 50, such as a piece of flexible material, a single capped pin or any other suitable hinging device.

In accordance with the preferred embodiment of the instant invention, a cover 42, formed from any suitable material, extends around the inlet body 20. As will be described in detail below, the cover 42 acts to secure the inlet body 20 to the missile body 22 of the missile 10. The cover 42 is secured to the missile body 22 by any suitable means, such as by an adhesive or by rivets. The cover 42 preferably includes outer edges 56, 58, 60 and 62 and inner edges 64, 66, 68, and 70, wherein a central cut-out portion is defined by the inner edges of the cover 42 and the inlet body 20 is positioned within the cut-out portion.

Figure 3:
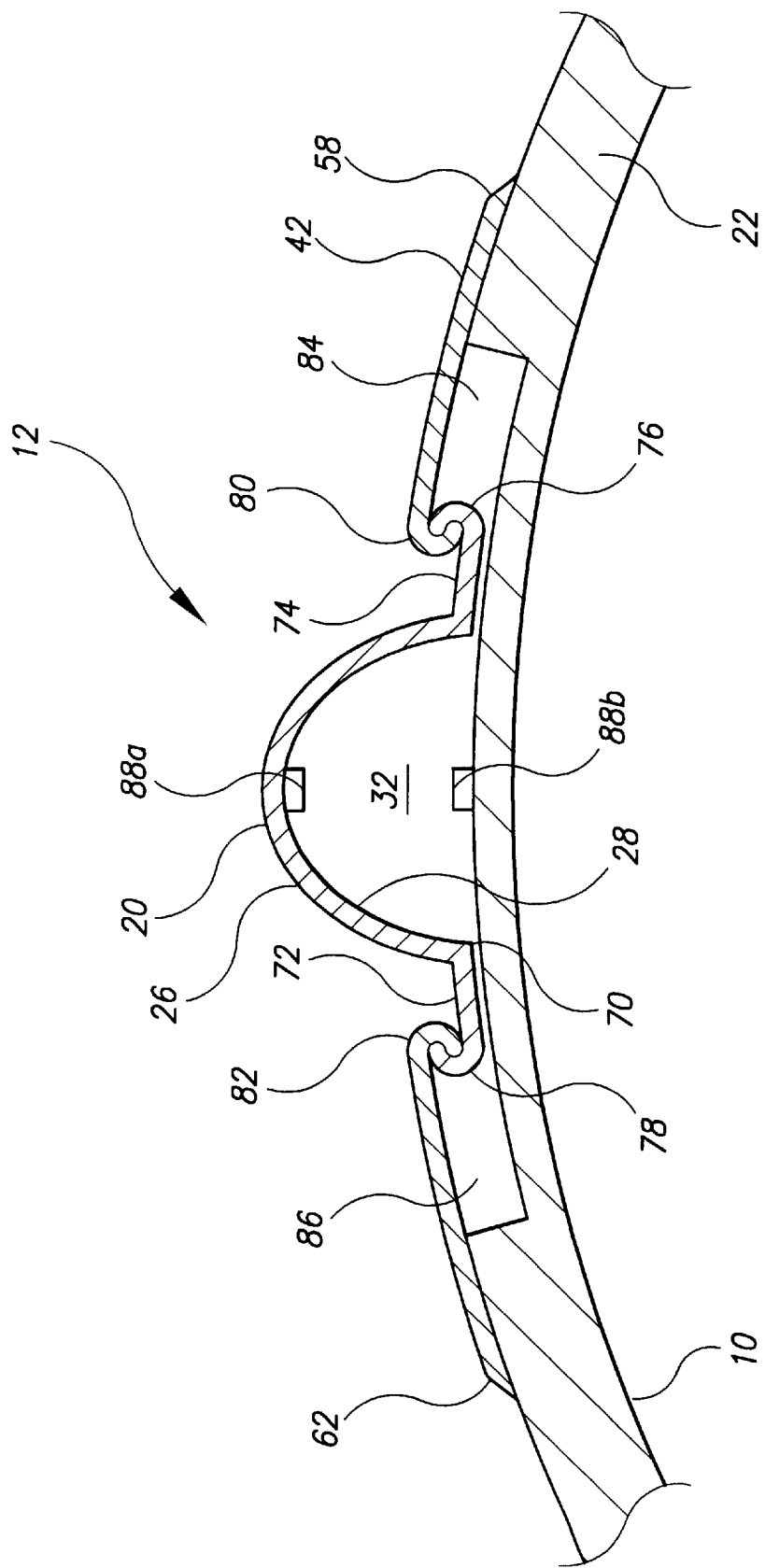
FIG. 3 is a sectional view of the self-deploying air inlet in its deployed condition along line 3—3 of FIG. 2.
Figure 5:
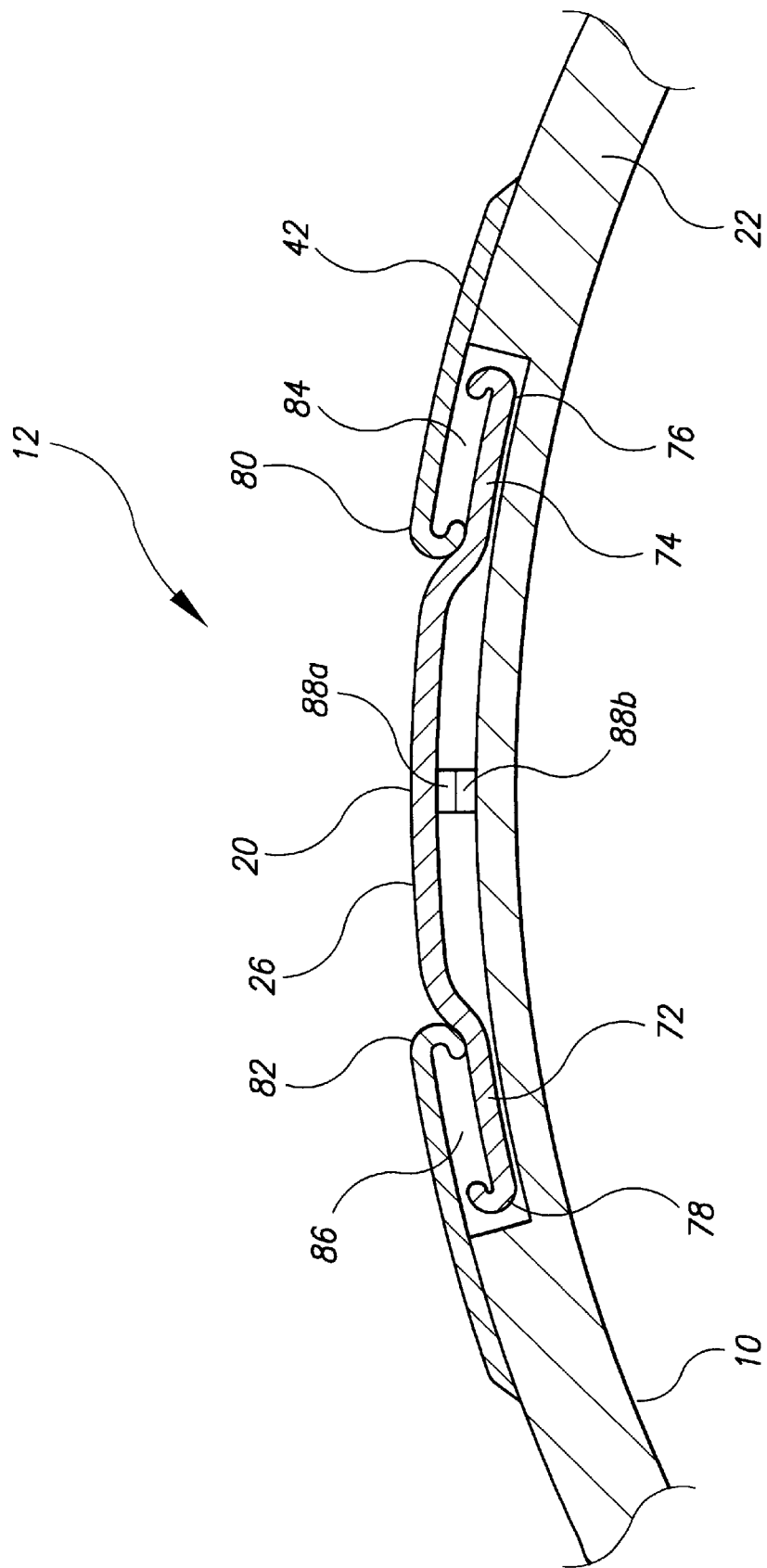
FIG. 5 is a sectional view of the self-deploying air inlet in its stowed condition along line 5—5 of FIG. 4.

As shown in FIG. 3, the inlet 12 includes connecting members 72 and 74, in the form of sliding connectors, along each side edge of the inlet body member 20, respectively, for use in connecting the inlet body member 20 to the missile 10. A flexible joint 70 is defined between the connecting members 72 and 74 so that the inlet body 20 can move between the deployed and stowed conditions, as will explained in further detail below. The connecting members 72 and 74 are preferably integrally formed with the body member 20. The connecting members are designed to slide into recesses or openings 84 and 86 defined between the missile body 22 and the cover 42. As shown in FIGS. 3 and 5, the openings may be formed by forming an indented portion in the missile body 22 itself or by simply leaving a sufficient space between the cover 42 and the missile body 22.

The connecting members 72 and 74 include an upwardly extending U-shaped locking member 76 and 78 on the outer edges thereof. As seen most clearly in FIG. 3, the inside side edges of the cover 42 include downwardly extending U-shaped locking members 80 and 82 designed to engage in a cooperating relationship with the locking members 76 and 78, respectively, on the connecting members 72 and 74 when the inlet is in the deployed condition shown in FIGS. 2 and 3. More particularly, when the inlet body 20 moves from its stowed condition to its deployed condition, the locking members on the cover 42 and connector members 72 and 74 slide into a respective interlocking relationship and form an air-tight seal between the air inlet 20 and the cover 42. It is understood that while U-shaped locking members are shown, any other suitable type of sliding connector and/or interlocking sealing device may alternatively be used in accordance with the instant invention.

Figure 4:
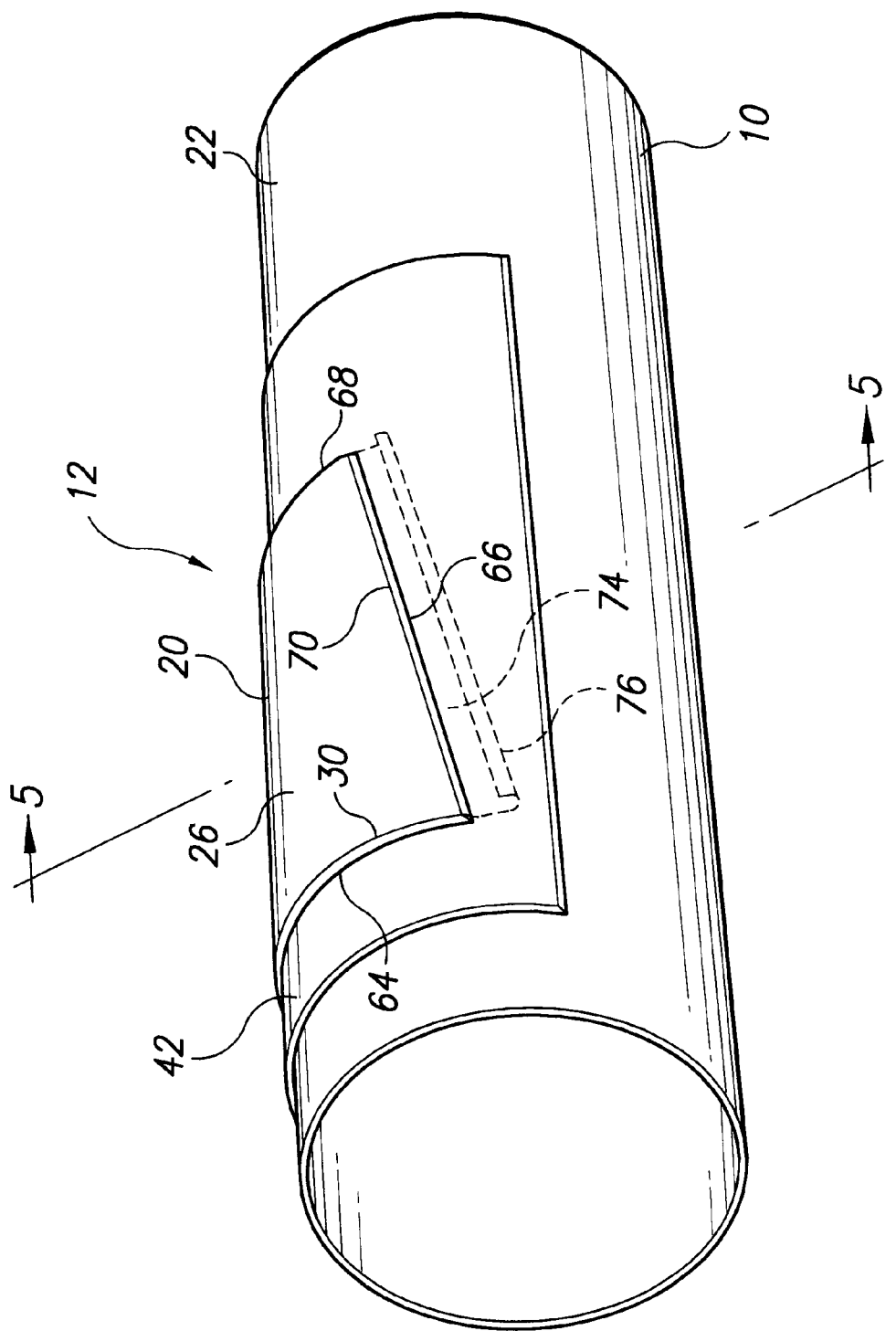
FIG. 4 is a perspective view of the self-deploying inlet in its stowed condition, in accordance with the preferred embodiment of the instant invention.

Referring now to FIG. 4, the inlet body 20 has sufficient flexibility to enable the inlet body to flex from the deployed condition to the stowed condition shown in FIG. 4. In other words, by applying a downward force on the top surface 26 of the inlet body, the inlet body flexes to a flatter configuration which generally corresponds to the curvature of the missile body 22, thereby defining a stowed condition for the inlet. Preferably, when the inlet body 20 is in its stowed condition, the flexible joint 70 on each side of the inlet body 20 is located directly under the respective inside side edge of the cover 42. The flexible joints 70 enable the connecting members 72 and 74 to slide smoothly in the recesses 82 and 84 when the inlet body is moving between the deployed and stowed conditions. The outer edges of the cover 42 are preferably flared to the missile contour to further provide a clean aerodynamic surface for the missile.

As shown in FIG. 5, when the inlet body 20 is forced into the stowed condition from the deployed condition, the sliding connecting members 72 and 74 slide outwardly in the recesses 84 and 86 respectively, and the locking members 76 and 78 on the ends of the connecting members 72 and 74 disengage from the cooperating locking members 80 and 82 on the cover 42. The recesses 84 and 86 are long enough to enable the connecting members 72 and 74 to slide therein a sufficient distance to allow the inlet body 20 to flex to the stowed condition. The connecting members 72 and 74 preferably have a radius of curvature which is substantially equal to that of the missile body. This allows the maintenance of a good seal with the missile body 10 and cover 42 when the inlet is stowed, and it enables the connecting members to establish a tight seal with the missile body 10 and the cover 42 when the inlet is deployed. A seal material (not shown) may be provided on the connecting members to further enhance the air-tight relationship between the inlet body and the missile. The outer surface 26 of the body member 20 is flush with the outer surface of the cover 42, and preferably is also flush with the outer surface of the missile body 22, thereby providing an aerodynamically clean inlet configuration.

In accordance with an important aspect of the instant invention, the inlet body 20 has a resiliency which biases the inlet body from the stowed condition to the deployed condition. In other words, when the inlet body is flexed to the stowed condition, the resiliency of the inlet body attempts to force the inlet body back to the deployed condition, which is the natural shape of the body member as explained above. This natural spring force provided by stored energy in the body member, resulting from forcing the body member into the stowed condition, is used to deploy the inlet back to the deployed condition at the desire time, thereby providing a self-deploying air inlet. The natural spring force provided by the resiliency of the inlet body, either alone or in conjunction with the aerodynamic forces to which the inlet is subjected during missile flight, is sufficient to cause the inlet to self-deploy to the deployed condition from the stowed condition without the need for a deployment actuator. The inlet is designed to resist flutter and maintains aerodynamic stability under varying load conditions.

A release or latching mechanism is provided for holding the inlet body in the stowed condition against the biasing force until such time as deployment is desired. In the preferred embodiment, the latching mechanism is comprised of cooperating electromagnetic contacts 88a and 88b positioned on the lower side 28 of the inlet body 20 and on the missile body 10, respectively. From a period of time prior to launch to a period shortly after the liquid propulsion phase of missile flight, the energized electromagnetic contacts are preferably used to maintain the inlet body 20 in close contact to the missile body 10. At the proper time in the missile's flight, the electromagnetic contacts are de-energized allowing the spring-biased inlet to separate from the missile body 10 and self-deploy. In accordance with the instant invention, various other techniques or devices may be used to hold the air inlet in its stowed condition and later release it at a predetermined time. For example, a temperature-dependent adhesive that looses its tackiness at a proper time to deploy the air inlet during the air breathing stage of the missile's flight could be utilized. Other suitable alternatives include simple mechanical latch mechanisms and/or other timed release mechanisms.

As is apparent from the foregoing description, the instant invention provides an improved air inlet for an air-breathing missile or the like. The inlet is less complicated, requires fewer parts, is less expensive to manufacture, and is more reliable than prior art air inlet devices.

While the preferred forms and embodiments of the instant invention have been illustrated and described, it will be apparent to those of ordinary skill in the art that various changes and modifications may be made without deviating from the inventive concepts and spirit of the invention as set forth above, and it is intended by the appended claims to define all such changes and modifications which come within the full scope and true spirit of the invention.

I claim:

1. A self-deploying air inlet for an air-breathing vehicle, comprising an inlet body having a natural shape which defines a deployed condition for said air inlet wherein an air deflecting surface is provided thereby, said inlet body having a flexibility which enables said inlet body to flex from said deployed condition to a stowed condition and a resiliency which biases said inlet body toward said deployed condition when in said stowed condition, said air inlet further comprising connecting means for connecting said inlet body to said vehicle in a manner which enables said inlet body to move between said stowed condition and said deployed condition, wherein said inlet body has a generally curved shape, and further wherein said inlet body has a forward body portion having a greater radius of curvature when in said stowed condition than when in said deployed condition.

2. A self-deploying air inlet as defined in claim 1, wherein said forward body portion has a radius of curvature when in said deployed condition which is less than a radius of curvature of an outer surface of said vehicle at a location where said inlet is connected therewith.

3. A self-deploying air inlet as defined in claim 2, wherein said radius of curvature of said inlet body in said stowed condition generally corresponds to said radius of curvature of said outer surface of said vehicle.

4. A self-deploying air inlet as defined in claim 1, wherein said connecting means comprises a sliding connector secured to each side edge of said inlet body, wherein the sliding connectors are constructed and arranged to be slidably received and retained in corresponding connecting slots on said vehicle.

5. A self-deploying air inlet as defined in claim 4, further comprising a cover constructed to be secured to said vehicle such that said connecting slots are defined by spacing between said cover and said vehicle.

6. A self-deploying air inlet as defined in claim 5, wherein said cover has a cut-out portion in which said inlet body is positioned, said cut-out portion having a size and shape which generally correspond to a size and shape of said inlet body when in said stowed condition.

7. A self-deploying air inlet as defined in claim 5, wherein said sliding connector on each of the side edges of said inlet body extends substantially the length of said side edges, said sliding connector and said cover including cooperating interlocking elements which engage when said inlet body is in said deployed condition to provide an air seal therebetween.

8. A self-deploying air inlet as defined in claim 7, wherein said sliding connector on each of said side edges is secured to said inlet body by a flexible joint.

9. A self-deploying air inlet as defined in claim 8, wherein said sliding connector has a radius of curvature which substantially corresponds to a radius of curvature of an outer surface of said vehicle at a location where said inlet is connected therewith.

10. A self-deploying air inlet as defined in claim 7, wherein said cooperating interlocking elements define a U-joint seal.

11. A self-deploying air inlet as defined in claim 5, wherein said cover includes cover edges which are flared to a contour of said vehicle.

12. A self-deploying air inlet as defined in claim 4, wherein said connecting means further comprises a hinge which is constructed to pivotably connect a back edge of said inlet body with said vehicle.

13. A self-deploying air inlet as defined in claim 1, further comprising latching means on said inlet body operable to selectively hold said inlet body in said stowed condition against said biasing from said resiliency until said deployed condition is desired.

14. A self-deploying air inlet as defined in claim 1, wherein said air-breathing vehicle is an air-breathing missile system.

* * * * *